US012656208B2

(12) United States Patent
Kim et al.

(10) Patent No.: US 12,656,208 B2
(45) Date of Patent: Jun. 16, 2026

(54) LEAK DETECTION DEVICE

(71) Applicant: HanJungNCS.CO., LTD,
Yeongcheon-si (KR)

(72) Inventors: Hwan Sik Kim, Yeongcheon-si (KR);
Hwan Seob Kim, Daegu (KR); Hyung Kyun Shin, Gyeongsan-si (KR); Pill Soo Kang, Daegu (KR); Young Wook Cho, Daegu (KR)

(73) Assignee: HanJungNCS.CO., LTD,
Yeongcheon-si (KR)

( * ) Notice: Subject to any disclaimer, the term of this patent is extended or adjusted under 35 U.S.C. 154(b) by 328 days.

(21) Appl. No.: 18/516,985

(22) Filed: Nov. 22, 2023

(65) Prior Publication Data
US 2025/0012661 A1      Jan. 9, 2025

(30) Foreign Application Priority Data

Jul. 6, 2023     (KR) ........................ 10-2023-0087703

(51) Int. Cl.
G01M 3/32          (2006.01)
(52) U.S. Cl.
CPC ........ G01M 3/3245 (2013.01); G01M 3/3209 (2013.01)

(58) Field of Classification Search
CPC ..... G01M 3/32; G01M 3/3236; G01M 3/3245
See application file for complete search history.

(56) References Cited

U.S. PATENT DOCUMENTS

2016/0081224 A1*   3/2016   Terävä ............... H05K 7/20327
                                                         165/80.4
2022/0159872 A1*   5/2022   Tung ..................... H05K 7/203

FOREIGN PATENT DOCUMENTS

| JP | 2014-157780 | 8/2014 |
|---|---|---|
| JP | 2017-133817 | 8/2017 |
| JP | 2017-213250 | 12/2017 |
| KR | 10-2021-0128597 | 10/2021 |
| KR | 10-2324254 | 11/2021 |
| WO | 2015198489 | 12/2015 |

* cited by examiner

*Primary Examiner* — Erika J. Villaluna
(74) *Attorney, Agent, or Firm* — PnK IP LLC

(57)          ABSTRACT
Proposed is a leak detection device including a level measurement means coupled to a cooling water storage tank in which cooling water is stored, and configured to measure a cooling water level in the cooling water storage tank, and a controller configured to detect a leak on the basis of operating mode information of the cooling system recognized on the basis of information received from the cooling system, and cooling water level information received from the level measurement means.

7 Claims, 5 Drawing Sheets

Controller

Leak notification part

250(251,252)

LEAK DETECTION DEVICE

CROSS REFERENCE TO RELATED APPLICATION

This application claims priority from and the benefit of Korean Patent Application No. 10-2023-0087703, filed on Jul. 6, 2023, which is hereby incorporated by reference for all purposes as if fully set forth herein.

BACKGROUND

Field

The present disclosure relates to a leak detection device for detecting a leak in a cooling system used in an energy storage system (ESS).

Discussion of the Background

An energy storage system is a technology for storing electrical energy to use the electrical energy later when needed, thus improving the safety of power supply.

The energy storage system uses multiple battery modules for storing power, and the energy storage capacity and safety of the battery modules are variable depending on ambient temperature. Therefore, the temperature is controlled through a cooling system in order to improve the performance of the energy storage system.

The cooling system uses a method of circulating fluid, such as cooling water, for temperature control. When cooling water leaks, a fire may occur due to dielectric breakdown caused by the leaked cooling water, so it is crucial to quickly detect the interruption of cooling water and deal with this.

In the related art, leak detection is performed by detecting a pressure change in cooling water flowing through a pipe. However, the above-described cooling system operates at low pressure, so it is practically difficult to detect a minor leak through pressure change.

Accordingly, there is a growing need to develop a leak detection device for more precisely detecting a leak occurring in the cooling system and supporting dealing with the leak quickly.

The above information disclosed in this Background section is only for understanding of the background of the inventive concepts, and, therefore, it may contain information that does not constitute prior art.

SUMMARY

The present disclosure is directed to providing a leak detection device capable of quickly recognizing a leak occurring in a cooling system to prevent accidents that may occur due to the leak.

Additional features of the inventive concepts will be set forth in the description which follows, and in part will be apparent from the description, or may be learned by practice of the inventive concepts.

According to one aspect of the invention, a leak detection device includes: a level measurement means coupled to a cooling water storage tank in which cooling water is stored, and configured to measure a cooling water level in the cooling water storage tank; and a controller configured to detect a leak on the basis of operating mode information of the cooling system recognized on the basis of information received from the cooling system, and cooling water level information received from the level measurement means.

The leak detection device may further include a leak notification part configured to provide leak detection information to a central server or a manager terminal or both when the controller detects the leak of the cooling water.

The controller may include: a cooling system information collection part configured to communicate with the cooling system to collect information on the cooling system; a level information collection part configured to communicate with the level measurement means to collect the level information; and a leak determination part configured to determine a reference level on the basis of the level information collected by the level information collection part, and to determine that the leak has occurred when the determined reference level is out of a set range.

The leak determination part may include: a water level stabilization determination part configured to determine whether the level in the cooling water storage tank is stabilized; a reference level determination part configured to determine the reference level using the cooling water level information collected by the level information collection part for a set period of time when the water level stabilization determination part determines that the level is stabilized; and a determination module configured to determine that the leak has occurred when the cooling water level received through the level information collection part is different by a set value or greater from the reference level determined by the reference level determination part.

The controller may further include an operating mode determination part configured to determine an operating mode of the cooling system on the basis of the information collected by the cooling system information collection part, and the leak determination part may be configured to determine the reference level again when it is determined that the operating mode of the cooling system is changed.

The controller may further include a temperature information collection part configured to collect cooling water temperature information of the cooling system, and the determination module may be configured to apply correction to the cooling water level used for leak determination, on the basis of a temperature received from the temperature information collection part.

In addition, the level to which correction by the determination module according to temperature change is applied may be derived by Equation 1.

$$h1 = h0 - C \times (t1 - t0) \qquad \text{Equation 1)}$$

$(h0:$ the reference level, $h1::$ the level to which correction based on a cooling water temperature change is applied, $t0:$ a reference temperature(the temperature when the reference level is measured), $t1:$ a current temperature, $C:$ a correction coefficient)

The leak detection device may further include a cooling water flow limiting means positioned facing a cooling water inlet part, inside the cooling water storage tank.

The cooling water flow limiting means may have a porous structure.

The cooling water flow limiting means may include: a limiting means housing of which the front side facing the cooling water inlet part is open, wherein cooling water outlets are formed in the top and the bottom of the limiting means housing; and a flow weakening protrusion formed at an inner surface of the limiting means housing.

The leak detection device may further include an intermediate depository tank coupled to the top of the cooling water storage tank, wherein the cooling water that has circulated through the cooling system flows into the intermediate depository tank. A first cooling water inlet opening and a second cooling water inlet opening may be formed in the lower edge of the intermediate depository tank and the upper edge of the cooling water storage tank facing the lower edge of the intermediate depository tank, respectively.

The leak detection device may further include a spiral cooling water falling path formation means coupled to an inner surface of the cooling water storage tank.

The leak detection device according to the present disclosure detects a leak using a change in the cooling water level in the cooling water storage tank, thus having a great leak detection capacity compared to the related art in which a leak is detected using pressure.

In addition, detected leak information can be provided to a manager, thus quickly dealing with leak situations.

In addition, an average value of levels recognized for a predetermined period of time is determined as the reference level, so the determined reference level is highly reliable.

In addition, as a reference level is reset each time the operating mode of the cooling water system changes, level errors occurring because of mode changes can be effectively dealt with.

In addition, a level change caused by temperature change is compensated for and is applied in determining the reference level, thereby more accurately determining the reference level and also accurately determining, on the basis of the reference level, whether a leak has occurred.

In addition, the flow of the cooling water contained in the tank due to the cooling water flowing in through the cooling water flow limiting means can be minimized, thus achieving more accurate level measurement.

In addition, the cooling water is recovered by directing the cooling water to flow to the edge of the cooling water storage tank, thus minimizing the flow of the cooling water contained in the tank due to the recovered cooling water.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts

DETAILED DESCRIPTION

Figure 1:
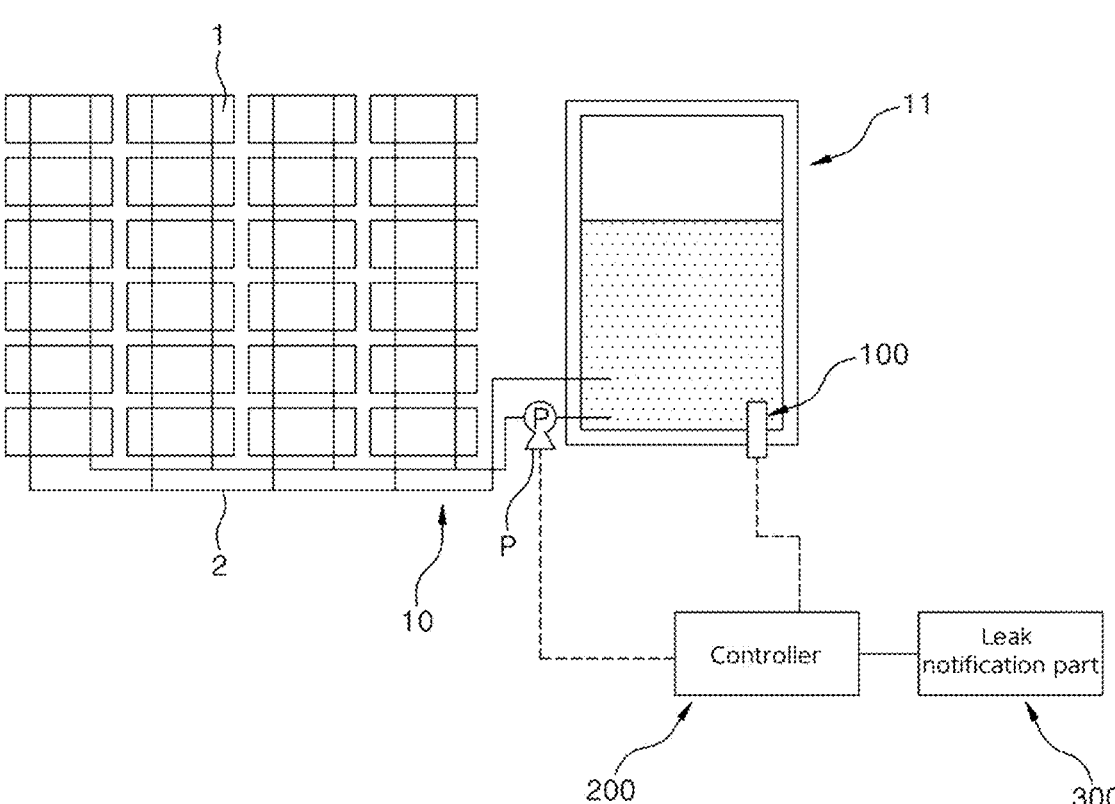
FIG. 1 is a conceptual diagram illustrating a leak detection device according to the present disclosure coupled to a cooling system.

Advantages and features of embodiments of the present disclosure, and methods to achieve the same will be apparent from the following embodiments that will be described in detail with reference to the accompanying drawings. However, the present disclosure may be embodied in many different forms, and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the description, the same reference numerals refer to same elements.

In the following description, when it is determined that a detailed description of a known function or element related with the present disclosure makes the gist of the present disclosure unclear, the detailed description will be omitted. Further, the terms described below defined considering functions in the embodiments of the present disclosure may be variable depending on the intention of the user, the operator, or the custom. Therefore, the definitions should be based on the contents throughout this specification.

Hereinafter, a leak detection device 1000 according to the present disclosure will be described with reference to the accompanying drawings.

Figure 2:
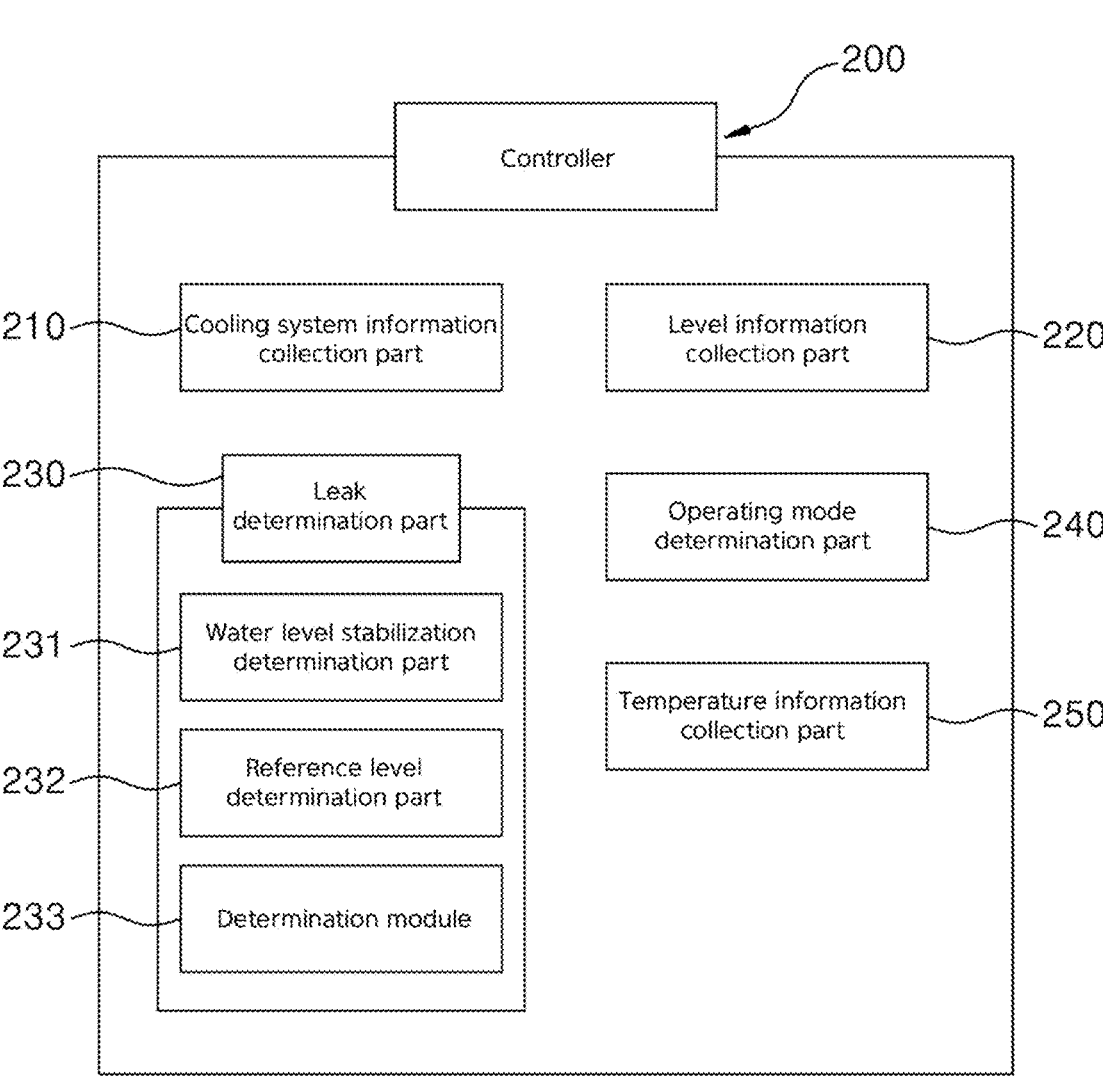
FIG. 2 is a block diagram illustrating a controller of the leak detection device according to the present disclosure.
Figure 3:
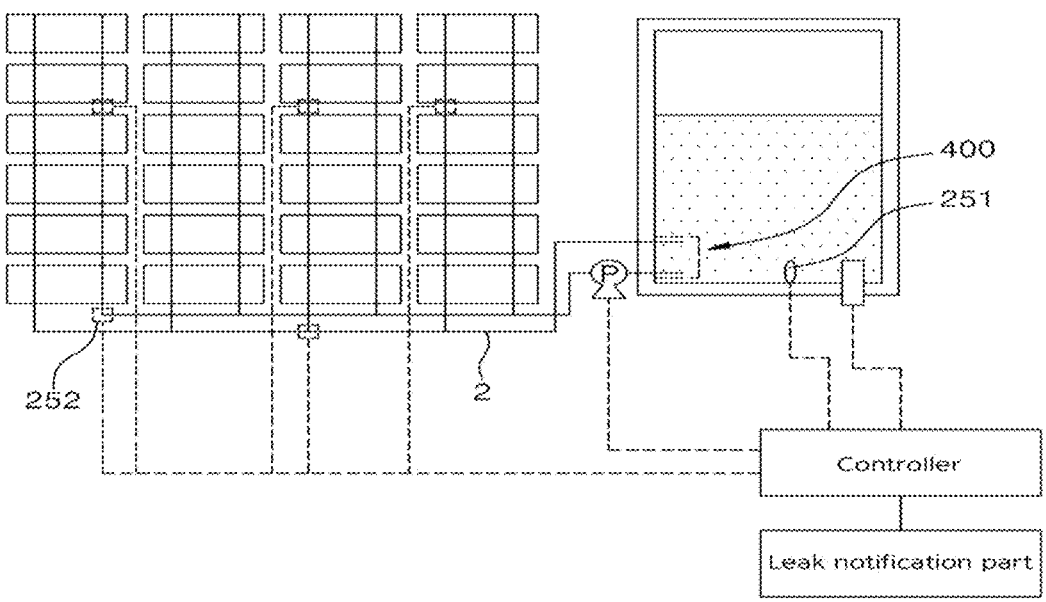
FIG. 3 is a conceptual diagram illustrating a temperature information collection part and a cooling water flow limiting means coupled to the leak detection device according to the present disclosure.
Figure 4:
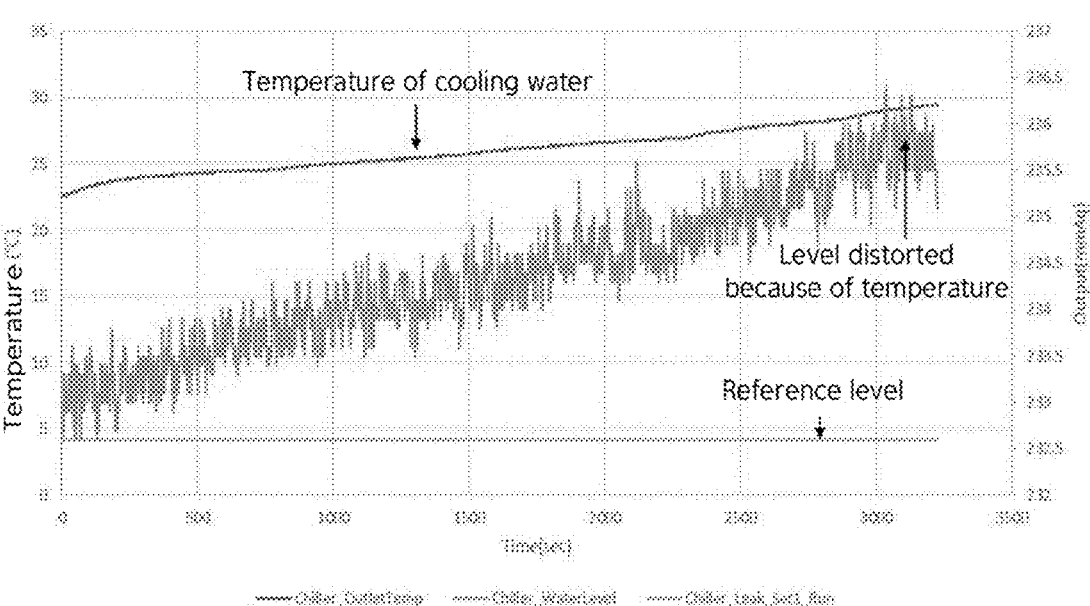
FIGS. 4 and 5 are diagrams illustrating experimental data to explain the difference before and after compensation for a cooling water level measurement value according to temperature.
Figure 5:
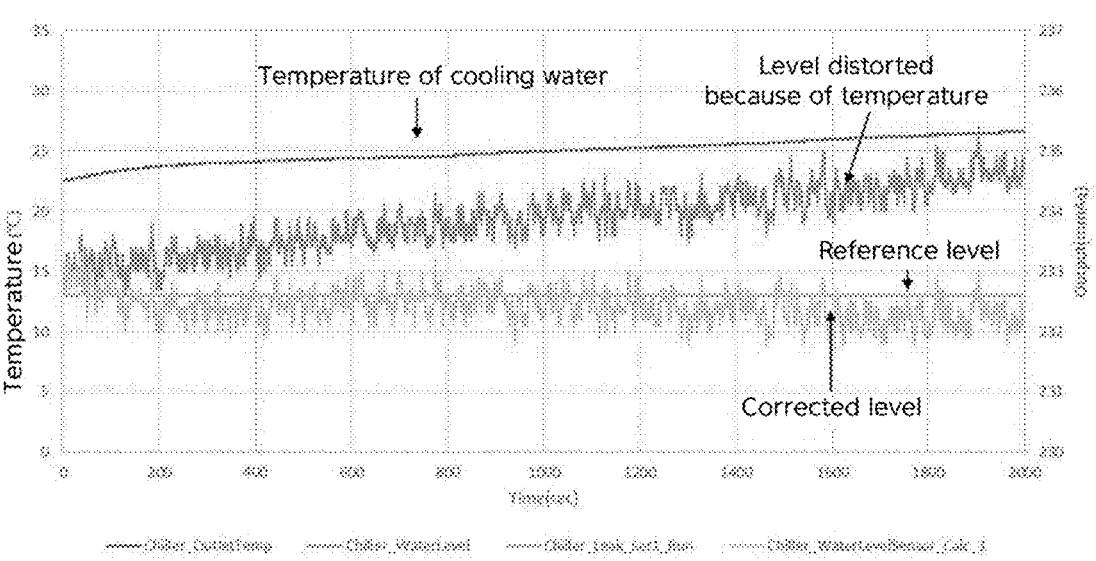
Figure 6:
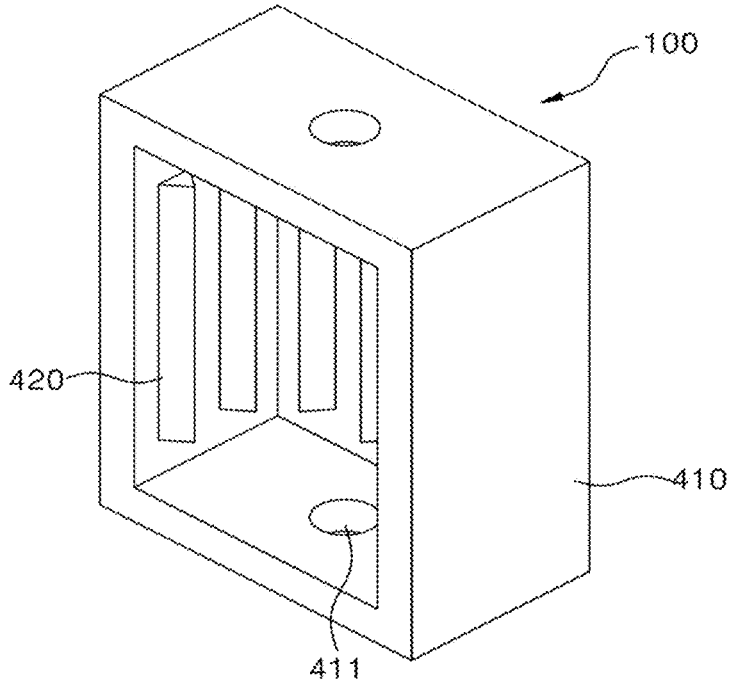
FIG. 6 is a diagram illustrating an example of a cooling water flow limiting means of the leak detection device according to the present disclosure.
Figure 7:
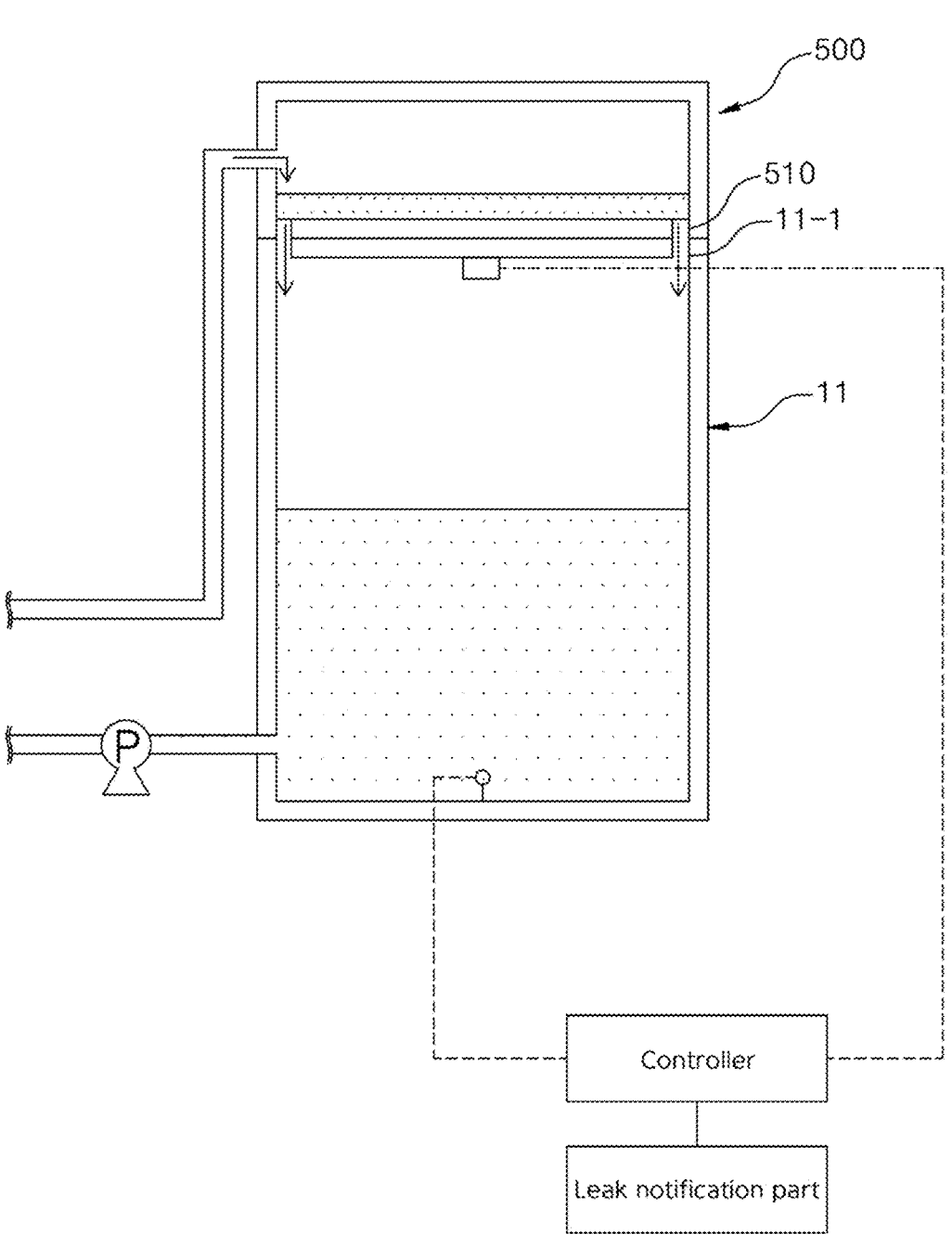
FIG. 7 is a conceptual diagram illustrating an intermediate depository tank coupled to the leak detection device according to the present disclosure.

FIG. 1 is a conceptual diagram illustrating a leak detection device according to the present disclosure coupled to a cooling system. FIG. 2 is a block diagram illustrating a controller of the leak detection device according to the present disclosure. FIG. 3 is a conceptual diagram illustrating a temperature information collection part and a cooling water flow limiting means coupled to the leak detection device according to the present disclosure. FIGS. 4 and 5 are diagrams illustrating experimental data to explain the difference before and after compensation for a cooling water level measurement value according to temperature. FIG. 6 is a diagram illustrating an example of a cooling water flow limiting means of the leak detection device according to the present disclosure. FIG. 7 is a conceptual diagram illustrating an intermediate depository tank coupled to the leak detection device according to the present disclosure.

Referring to FIGS. 1 to 5, a leak detection device 1000 according to the present disclosure may include: a level measurement means 100 coupled to a cooling water storage tank 11 in which cooling water is stored, and configured to measure a cooling water level in the cooling water storage tank 11; a controller 200 configured to detect a leak on the basis of operating mode information of the cooling system 10 recognized on the basis of information received from the cooling system 10, and cooling water level information received from the level measurement means 100; and a leak notification part 300 configured to provide leak detection information to a central server or a manager terminal or both when the controller 200 detects the leak of the cooling water.

Specifically describing, the energy storage system ESS uses multiple battery modules 1 and the performance of the battery modules 1 is affected by ambient temperature, so the temperature of the space in which the battery modules 1 are positioned is maintained at a set value through the cooling system 10.

Herein, when there is a leak in a pipe 2 through which cooling water flows, a fire may occur due to dielectric breakdown caused by the leaked cooling water. Therefore, in the present disclosure, a leak is determined on the basis of cooling water level information received from the level measurement means 100, and when it is determined that a leak has occurred, the leak notification part 300 provides leak information to a manner for dealing with the leak quickly.

Herein, the level measurement means 100 may be at least one of level-measuring devices, such as an ultrasonic sensor, a laser sensor, and a buoyancy-type level measuring device (float). Without limited thereto, examples of the level measurement means 100 may include various devices capable of measuring the level.

In addition, regarding the detection of a leak by the controller 200, when the level in the cooling water storage tank 11 is changed by a set value or greater, it is determined that a leak has occurred. The set value may be a stored change amount or a stored change rate or both.

Referring to FIG. 2, the controller 200 may include a cooling system information collection part 210 configured to communicate with the cooling system 10 to collect information on the cooling system 10; a level information collection part 220 configured to communicate with the level measurement means 100 to collect level information; and a leak determination part 230 configured to determine a reference level on the basis of the level information collected by the level information collection part 220, and to determine that a leak has occurred when the determined reference level is out of a set range.

Specifically describing, the cooling water is circulated by the pump P, so the flow of the fluid occurs inside the cooling water storage tank 11. Because of the fluid flow, the level measured in the level measurement means 100 varies. The leak determination part 230 determines an average value of levels collected for a predetermined period of time as the reference level, and determines whether a leak has occurred on the basis of the determined reference level.

Herein, the calculation of the average value of the cooling water levels is based on a period of time set by a user, and is performed while the operating mode of the cooling system 10 remains constant. When the operating mode is changed, the reference level is determined again.

In addition, the leak determination part 230 may include: a water level stabilization determination part 231 configured to determine whether the level in the cooling water storage tank 11 is stabilized; a reference level determination part 232 configured to determine the reference level using cooling water level information collected by the level information collection part 220 for a set period of time when the water level stabilization determination part 231 determines that the level is stabilized; and a determination module 233 configured to determine that a leak has occurred when the cooling water level received through the level information collection part 220 is different by a set value or greater from the reference level determined by the reference level determination part 232.

Specifically describing, when the operating mode of the cooling system 10 is changed, the cooling water level in the cooling water storage tank 11 is variable. Therefore, the stabilization determination part 231 determines that the changing of the operating mode of the cooling system is completed and the level is stabilized when the cooling water level is maintained at a constant level for a set period of time. When the level is stabilized, the reference level determination part 232 determines the reference level using the collected cooling water level information.

In addition, the determination module 233 uses the finally determined reference level information to perform leak determination.

The controller 200 may further include an operating mode determination part 240 configured to determine the operating mode of the cooling system 10 on the basis of information collected by the cooling system information collection part 210. The leak determination part 230 may determine the reference level again when it is determined that the operating mode of the cooling system 10 is changed.

Specifically describing, the operating state of the cooling system 10 may be variable in accordance with the state of the energy storage system E. When the operating mode of the cooling system 10 is changed, the level of the cooling water stored in the cooling water storage tank 11 is also changed accordingly. The cooling water level change occurring when the operating mode of the cooling system is changed may be erroneously determined as the occurrence of a leak.

Accordingly, in the present disclosure, when the operating mode determination part 240 determines that the operating mode of the cooling system 10 is changed, the leak determination part 230 determines the reference level again.

Herein, the re-determining of the reference level means that the determining of whether the level is stabilized by the water level stabilization determination part 231 and the determining of the reference level by the reference level determination part 232 are performed again.

In addition, the determining of the operating mode of the cooling system 10 may be performed on the basis of information on the cooling system 10 collected by the cooling system information collection part 210. More specifically, the information may be at least one of the following: control information received from a control device of the cooling system 10, an operating state of the pump P of the cooling system 10, and a flow rate change in the cooling water flowing through the pipe 2 of the cooling system 10.

In addition, when two or more of the three determination results obtained using the three methods described above indicate that the operating mode of the cooling system 10 is changed, it is finally determined that the operating mode is changed and the reliability of the determination of the operating mode is further increased.

Referring to FIGS. 3 to 5, the controller 200 includes a temperature information collection part 250 configured to collect cooling water temperature information of the cooling system 10. The determination module 233 may apply correction to the cooling water level used for leak determination on the basis of the temperature received from the temperature information collection part.

Specifically describing, when the temperature of the cooling water increases, as shown in FIG. 4, the cooling water in the pipe 2 of the cooling system 10 flows into the cooling water storage tank 11 and the cooling water level (the level distorted because of the temperature) increases and has a large difference from the reference level. Therefore, as shown in FIG. 5, the cooling water level (the level distorted because of the temperature) is corrected on the basis of the temperature to calculate a corrected level, and the level (corrected level) to which correction is applied is used to determine whether there is a leak.

More specifically, the determination module 233 applies correction to the cooling water level information collected by the level information collection part 220 on the basis of the temperature collected by the temperature information collection part 250, and the correction uses Equation 1 below.

$$h1 = h0 - C \times (t1 - t0)$$ <span style="float:right">Equation 1)</span>

(*h*0: the reference level, *h*1:: the level to which correction based on a cooling water temperature change is applied,

*t*0: a reference temperature(the temperature when the reference level is measured),

*t*1: a current temperature, *C*: a correction coefficient)

In addition, the temperature information collection part 250 may include: a first temperature sensor 251 coupled to the cooling water storage tank 11; and a second temperature sensor 252 provided at the pipe 2. A plurality of the second temperature sensors 252 may be provided.

Referring to FIGS. 3 and 6, the leak detection device 1000 according to the present disclosure may include a cooling water flow limiting means 400 positioned facing a cooling water inlet part, inside the cooling water storage tank 11.

Specifically describing, when the flow of the cooling water positioned in the storage tank 11 increases because of the fluid flowing through the pump P, the level measurement by the level measurement means 100 may not be accurately performed. Therefore, the flow limiting means 400 is used to reduce the flowability (flow velocity) of cooling water flowing into the storage tank 11.

Herein, the cooling water flow limiting means 400 may be a porous structure. However, as shown in FIG. 6, the cooling water flow limiting means 400 may be a device with a box-shaped structure. The cooling water flow limiting means 400 includes a limiting means housing 410 of which the front side facing the cooling water inlet part is open, and flow weakening protrusions 420. In the top and the bottom of the limiting means housing 410, cooling water outlets are formed. The flow weakening protrusions 420 are formed at the inner surface of the limiting means housing 410.

In addition, in the case of the cooling water flow limiting means 400 having the box-shaped structure, it is preferred that each of the flow weakening protrusions 420 has a triangular cross-sectional shape, so flow velocity decreases as the cooling water in contact with the flow weakening protrusions 420 flows into the left and right, and after the flow velocity is reduced, the cooling water flows through the cooling water outlets 411.

Furthermore, the cooling water flow limiting means 400 having the box-shaped structure may be tightly coupled to the inner surface of the cooling water storage tank 11 in which a cooling water inlet pipe coupling opening is formed. When a cooling water outlet 411 is formed only in the bottom of the limiting means housing 410, the flowability of cooling water may be more reduced before the cooling water is discharged.

Referring to FIG. 7, the leak detection device 1000 according to the present disclosure, an intermediate depository tank 500 is further included. The intermediate depository tank 500 is coupled to the top of the cooling water storage tank 11, and the cooling water that has circulated through the cooling system 10 flows into the intermediate depository tank 500. A first cooling water inlet opening 510 may be formed in the lower edge of the intermediate depository tank 500. A second cooling water inlet opening 11-1 may be formed in the upper edge of the cooling water storage tank 11 facing the lower edge of the intermediate depository tank 500.

Specifically describing, the cooling water that has circulated through the cooling system 10 flows in, resulting in the flow in the cooling water storage tank 11. Therefore, the intermediate depository tank 500 through which the recovered cooling water passes is formed on the top of the cooling water storage tank 11. The first cooling water inlet opening 510 and the second cooling water inlet opening 11-1 through which cooling water flows are formed in the lower edge of the intermediate depository tank 500 and the top of the cooling water storage tank 11, respectively. Accordingly, the cooling water flowing into the intermediate depository tank 600 passes through the first cooling water inlet opening 510 and the second cooling water inlet opening 11-1 and then flows into the cooling water storage tank 11, flowing down along the inner wall of the cooling water storage tank 11.

In addition, since there may be cooling water that falls instead of flowing along the inner wall of the cooling water storage tank 11, a spiral cooling water falling path formation means is coupled to the inner surface of the cooling water storage tank 11 to make the cooling water flow down along the cooling water falling path formation means.

The present disclosure is not limited to the embodiments, and the ranges of application of the present disclosure are diverse. It is to be understood that the present disclosure can be variously modified by those skilled in the art without departing from the gist of the present disclosure as claimed in the accompanying claims.

What is claimed is:

1. A leak detection device for detecting a leak in a cooling system (10), the leak detection device comprising:
   a level measurement device (100) coupled to a cooling water storage tank (11) in which cooling water is stored, and configured to measure a cooling water level in the cooling water storage tank (11);
   a controller (200) configured to detect a leak on the basis of operating mode information of the cooling system (10) recognized on the basis of information received from the cooling system (10), and cooling water level information received from the level measurement device (100); and
   a cooling water flow limiting device (400) facing a cooling water inlet part, inside the cooling water storage tank (11),
   wherein the cooling water flow limiting device (400) comprises a box-shaped structure including a plurality of flow weakening protrusions (420).

2. The leak detection device of claim 1, further comprising
   a leak notification part (300) configured to provide leak detection information to a central server or a manager terminal or both when the controller (200) detects the leak of the cooling water.

3. The leak detection device of claim 1, wherein the controller (200) comprises:
   a cooling system information collection part (210) configured to communicate with the cooling system (10) to collect information on the cooling system (10);
   a level information collection part (220) configured to communicate with the level measurement device (100) to collect the level information; and
   a leak determination part (230) configured to determine a reference level on the basis of the level information collected by the level information collection part (220), and to determine that the leak has occurred when the determined reference level is out of a set range.

4. The leak detection device of claim 3, wherein the leak determination part (230) comprises:

a water level stabilization determination part (231) configured to determine whether the level in the cooling water storage tank (11) is stabilized;

a reference level determination part (232) configured to determine the reference level using the cooling water level information collected by the level information collection part (220) for a set period of time when the water level stabilization determination part (231) determines that the level is stabilized; and a determination module (233) configured to determine that the leak has occurred when the cooling water level received through the level information collection part (220) is different by a set value or greater from the reference level determined by the reference level determination part (232).

5. The leak detection device of claim 3, wherein the controller (200) further comprises an operating mode determination part (240) configured to determine an operating mode of the cooling system (10) on the basis of the information collected by the cooling system information collection part (210), and the leak determination part (230) is configured to determine the reference level again when it is determined that the operating mode of the cooling system (10) is changed.

6. The leak detection device of claim 3, wherein the controller (200) further comprises a temperature information collection part (250) configured to collect cooling water temperature information of the cooling system (10), and the determination module (233) is configured to apply correction to the cooling water level used for leak determination, on the basis of a temperature received from the temperature information collection part.

7. The leak detection device of claim 6, wherein the level to which correction by the determination module (233) according to temperature change is applied is derived by Equation 1.

$$h1 = h0 - C \times (t1 - t0) \qquad \text{Equation 1)}$$

($h0$: the reference level, $h1$:: the level to which correction based on a cooling water temperature change is applied, $t0$: a reference temperature(the temperature when the reference level is measured), $t1$: a current temperature, $C$: a correction coefficient)

\* \* \* \* \*